July 17, 1956 H. H. HILE 2,754,768
SUSPENSION UNIT FOR RAILWAY VEHICLES
Filed June 19, 1952 3 Sheets-Sheet 1
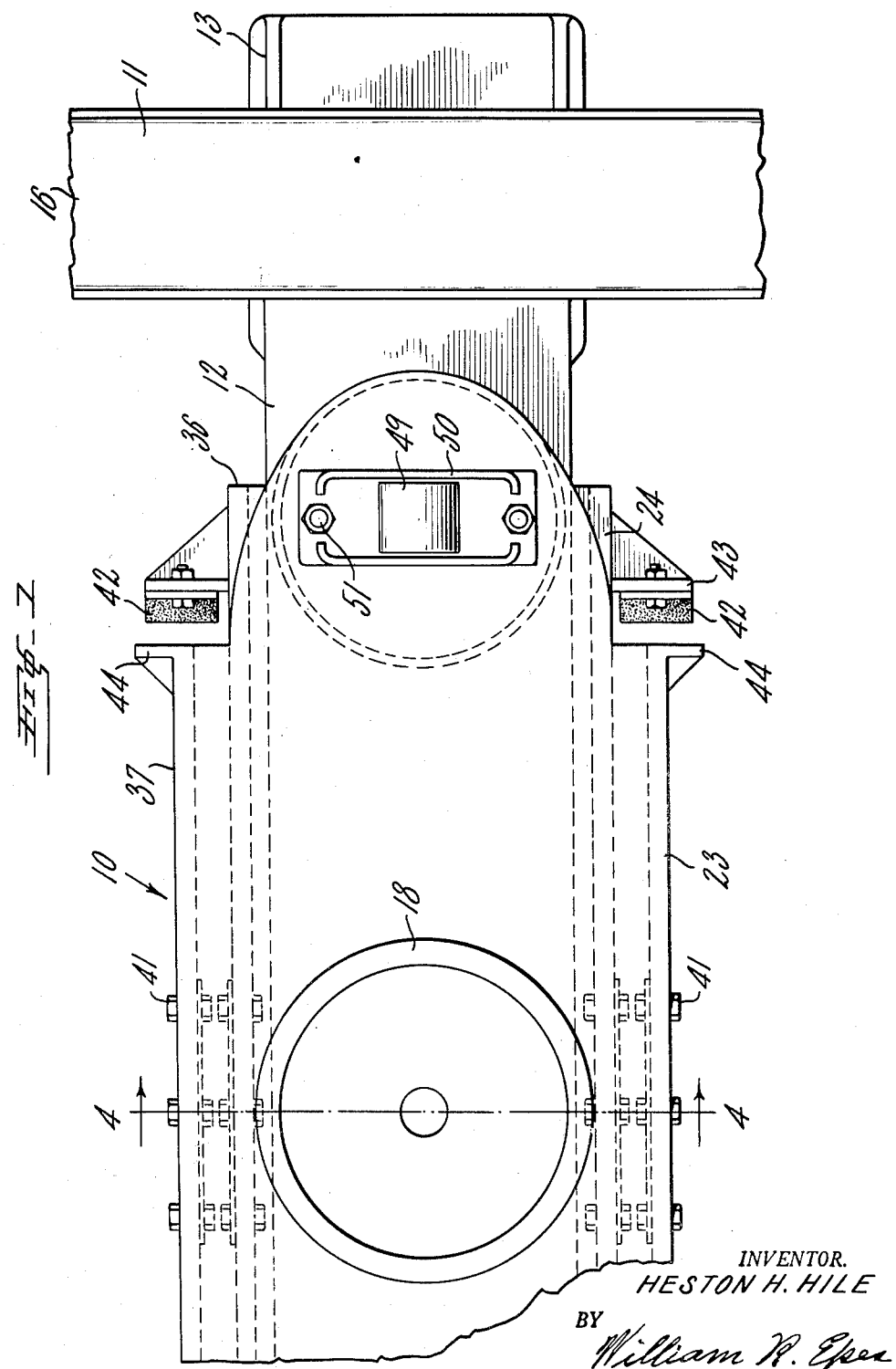
INVENTOR.
HESTON H. HILE
BY William R. Epes
ATTORNEY

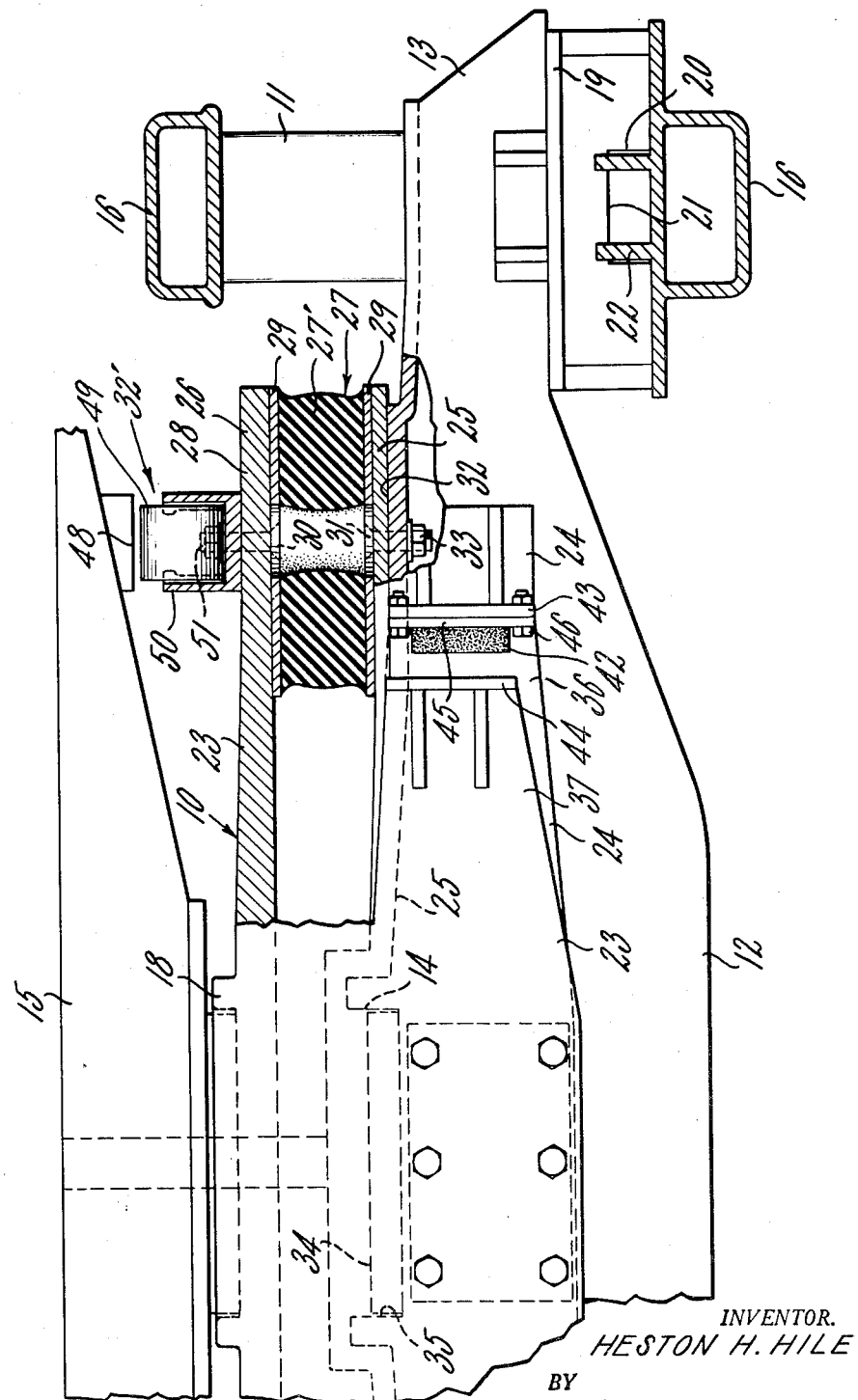

July 17, 1956 H. H. HILE 2,754,768
SUSPENSION UNIT FOR RAILWAY VEHICLES
Filed June 19, 1952 3 Sheets-Sheet 3
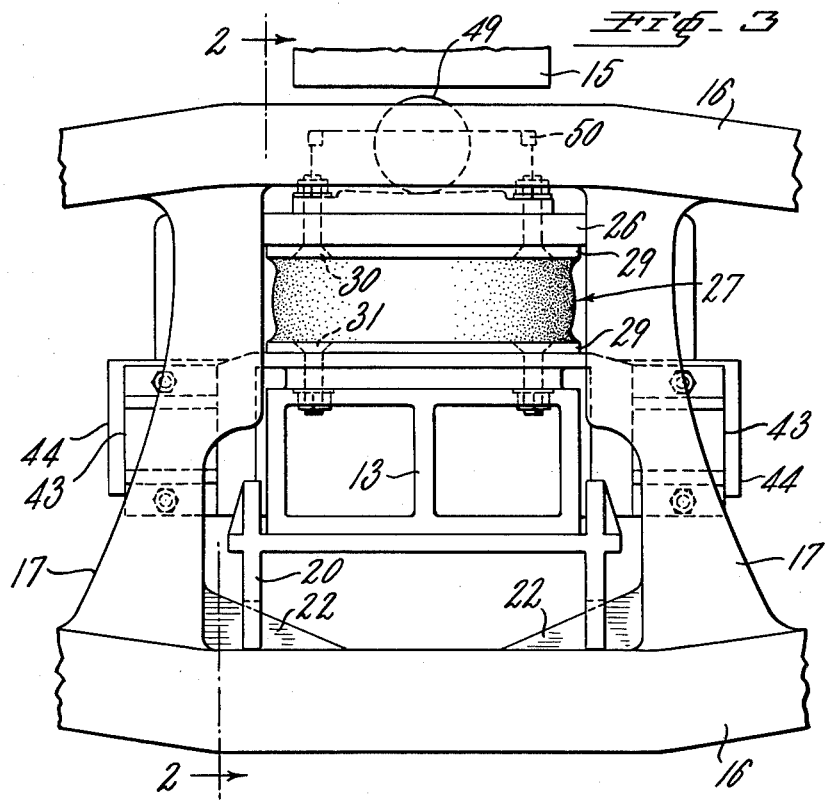
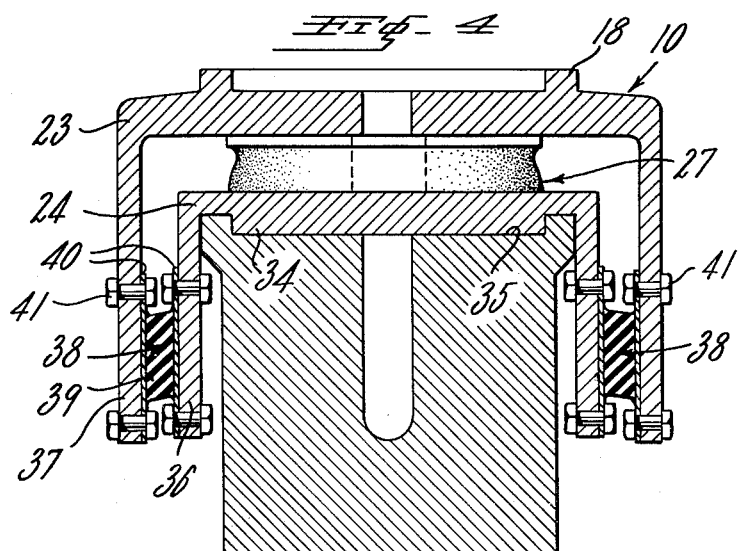
INVENTOR.
HESTON H. HILE
BY William A. Epes
ATTORNEY

United States Patent Office
2,754,768
Patented July 17, 1956

2,754,768

SUSPENSION UNIT FOR RAILWAY VEHICLES

Heston H. Hile, Fort Wayne, Ind., assignor to United States Rubber Company, New York, N. Y., a corporation of New Jersey Application June 19, 1952, Serial No. 294,324

6 Claims. (Cl. 105—197)

This invention relates to a novel suspension unit for railway vehicles and in particular to a suspension unit which can be used with trucks of existing conventional rolling stock to convert the cars from the conventional steel spring to a rubber suspension system.

Railway vehicle trucks in use today comprise essentially a truck frame provided with side frames supported on the car wheel axles, springs supported on the side frames, and a truck bolster supported on the springs. The truck bolster is provided with a center bearing and side bearing rollers for supporting the pintle or center bearing plate and side bearings respectively on the car body bolster. The truck bolster of the conventional freight car truck is normally supported in the truck frame to permit vertical movement only of the bolster relative to the frame. However, because of tolerances in casting, and because of the fact that the truck bolster must be free to move up and down with the springs, there is a small clearance between the bolster flanges and the truck frame, which causes high acceleration shocks to be transmitted to the car body. Other shocks are produced by the necessary side sway of the car body with respect to the truck. In some cases the side sway is permitted by axial play between the journal boxes and the flanges on the car wheel axle bearings and in other cases by suspending the spring platform on swing links.

It is a principal object of this invention to devise a resilient rubber shock insulating suspension unit for railway vehicles which reduces the shocks between the truck bolster and the frame, and also reduces the shocks resulting from the side sway of the car body, and which can be applied quickly to the existing conventional truck bolster without discarding any parts of any substantial significance, other than the steel springs. This object is achieved by means of a suspension unit comprising a lower elongated inverted channel shaped member which is telescoped within an upper elongated inverted channel shaped member having rubber shock mountings interposed therebetween and secured thereto. Such channel shaped members sometimes referred to hereinafter as inner and outer members may be made of castings or forgings. The lower or inner member is adapted to be secured to the conventional truck bolster with its bottom or base supported on the upper portion of the bolster, and its legs or sides extending downwardly on each side thereof. The upper channel member has the usual center and side bearings adapted to cooperate with the center bearing plate and side bearing plates, respectively, of the car body bolster in the conventional manner.

The load of the car body and its contents are transmitted to the upper channel member, and when the car is in transit the load exerts forces on the upper channel member in the downward direction and in all directions in the horizontal plane. The rubber mountings interposed between the channel members permits and resiliently controls the movement of the upper channel member in response to such forces, and reduces the shocks resulting therefrom. The vertical load is carried by compression rubber sandwich mountings which are interposed between and affixed to the ends of the bases of the upper and lower channel members. The load carrying mountings permit the necessary normal movement of the upper channel member, both vertically and horizontally, to reduce shocks resulting from the normal forces acting thereon in transit. The excessive movements resulting from side sway are cushioned and limited by resilient shock pads interposed between lateral projections on the upper and lower channel members, which reduce the shock resulting from side sway.

In order to reduce the shock resulting from the fore and aft forces exerted by the reacting forces of the car load and truck upon the upper channel member, resilient rubber mountings are interposed between the depending sides of the upper and lower channel members on each side of the bolster. Since the rubber mountings permit the side sway movement of the car body, the conventional axial play between the car wheel axle journals and the flanges on the axles may be reduced or eliminated, as well as the use of the swing platform for the car springs, which have been heretofore used to permit the necessary side sway movement in the car body in respect to the truck.

Another advantage of the novel suspension unit is found in the case with which it may be applied to the existing conventional railway truck. This may be done by removing the springs which support the ends of the bolster on the side frames, and supporting the bolster ends either directly on the truck frame, or on a block interposed between the frame and the end of the bolster which latter may be required to adjust the height of the bolster. The suspension unit is then affixed to the truck bolster.

This invention, its advantages and objects are further described in reference to the accompanying drawings, in which:

Fig. 1 is a plan view of a portion of a truck frame extending from one end of the bolster to and including the center bearing, and showing the corresponding portion of the suspension unit embodying this invention applied to the bolster;

Fig. 2 is a side elevation partly in section of the portion of the truck shown in Fig. 1 taken generally along line 2—2 of Fig. 3, in which portions of the channel members of the suspension unit, and the truck bolster are broken away to show one of the resilient suspension sandwiches for supporting the vertical load of the car on the conventional bolster and as so loaded;

Fig. 3 is an end elevational view of the portion of the truck shown in Fig. 1 looking inwardly from the side of the truck frame; and Fig. 4 is a sectional view taken along the line 4—4 of Fig. 1.

The suspension unit 10 for railway vehicles embodying this invention is illustrated in the drawings in reference to a conventional freight railway truck, having side frames 11, which are supported on the axles of the car wheels (not shown). The suspension unit 10 is supported by the original conventional bolster 12. For convenience, only a portion of the truck is shown and described herein, which includes a portion of one of side frames 11, and that portion of a conventional truck bolster 12 which extends from one end 13 thereof to and including the center bearing 14 (Fig. 2) thereon, and those parts of the suspension unit 10, and car body bolster 15 which are associated with the truck bolster 12. The other end portions of the bolster 12 and the associated parts correspond to those shown herein, and are therefore omitted. Referring particularly to Figs. 2 and 3, the truck side frame 11 comprises upper and lower beams 16, which extend between the car axles and carry the load of the car thereon. The upper and lower beams 16 are reinforced by connecting vertical struts 17. In the conventional truck, as in this case, the ends 13 of the bolster extend between the struts 17, which act as guides for such ends. In the conventional truck the ends 13 of the bolster 12 are supported on compression springs (not shown) interposed between the ends of the bolster and the lower beam 16. When applying the suspension unit 10 of this invention to conventional car trucks, the load supporting compression springs are eliminated, and each end of the truck bolster 12 is supported on the lower beam 16 between the struts 17. In order to position the bolster 12 at the desired level for the reception of the suspension unit 10 and placement of the center bearing 18 thereon for the car body bolster 15 at the original level of the center bearing 14 of the original bolster 12, a raised platform 19 having legs 20 provided with notches 21 to receive the fillets 22 between the struts 17 and the lower beam 16, is inserted between the bolster 12 and the lower beam.

As best shown in Figs. 2 and 4, the suspension unit 10 comprises an upper elongated inverted channel shaped member 23, into which a lower inverted channel shaped member 24 is nested or telescoped, and the bottoms, or bases 26 and 25 of the respective channel members are separated by compression rubber sandwich mountings 27, which are located at the ends 28 of the channel shaped members. Each of the rubber mountings 27, comprise a rubber block 27' which is bonded at its upper and lower surfaces to metal plates 29. The upper metal plate 29 is secured to the upper channel member 23 by bolts 30, and the lower plate 29 is secured to the lower channel member 24 by bolts 31, which may be used to secure the elements of the suspension unit 10 together prior to its installation on the bolster 12. Each end of the lower channel shaped member 24 is supported on the platform 32 of the bolster 12 for the original side bearing 32', which has been removed from the bolster 12, and is now secured to the upper channel member 23 by the bolts 30. As shown herein, the bolts 31 extend through the bottom mounting plate 29, the base 25 of the channel member 24, and the platform 32. The ends of the suspension unit 10 are clamped to the bolster 12 by turning the nuts 33 onto the ends of the bolts 31. The center of the suspension unit 10 is anchored to the bolster 12 by a depending head 34 on the base 25 of the lower channel member 24, which fits into the original center bearing cup 35 of the original center bearing 14 on the bolster 12.

As particularly shown in Fig. 4, the depending legs, or sides 36, of the lower channel member 24, and the depending legs 37 of the upper channel member 23 extend downwardly along the bolster 12, and a rubber sandwich mounting 38 is interposed between the legs of the respective channel members on each side of the bolster 12 for the purpose of cushioning the fore and aft movement of the upper channel member 23 in respect to the fixed lower channel member 24. The resilient mountings 38 comprise rubber blocks 39 having their opposite faces bonded to metal plates 40, which are secured to the opposed depending legs 36 and 37 of the channel members 23 and 24 by bolts 41. The vertical and transverse movements of the channel member 23 subjects the rubber blocks 39 to shear stresses, and assists the compression rubber sandwiches 27 in controlling the normal side sway motion of the car body. The primary purpose of the mounting 38 is to perform the normal functions of the chafing plates heretofore used to receive the fore and aft forces exerted on the bolster and permit either vertical and/or side sway motions thereof. In addition to such functions of the chafing plates, the rubber blocks 39 also cushion and insulate the shocks resulting from such fore and aft motions. In the event such additional functions are not desired, the usual chafing plates may be substituted for the mounting 38.

As particularly shown in Figs. 1 and 2, the excessive side sway of the car body is controlled by shock pads 42 of resilient rubber, which are interposed between opposed laterally projecting brackets 43 and 44, respectively, on the opposite sides of the inner and outer channel members 24 and 23. The dimensions of the downward depending legs 37 of the upper channel member 23 measured lengthwise of said channel member are less than the corresponding dimensions of the downward depending legs 36 of the lower channel member 24, and the lateral brackets 44 are placed on the ends of the legs of the upper channel member so that they reciprocate between the lateral brackets 43 on the ends of the legs of the lower channel member 24 and limit the side sway of the car body by bumping against the pads 42 on the brackets 43. The resilient rubber pads 42 are bonded to metal plates 45, which are secured to the laterally extending brackets 43 of the lower channel member 24 by means of bolts 46.

The side bearing 32' for each end of the car body bolster 15 comprises the usual side bearing plate 48 on the car body bolster. The bearing plate 48 is adapted to bear on the side bearing roller 49, which is retained in the usual guide channel 50 secured to the base 26 of the outer channel member 23. The bolts 30 extend through the upper mounting plate 29 of the load supporting mounting 27, the base 26 of the channel member 23, the roller guide channel 50, and the parts are clamped together by nuts 51 on the ends of the bolts.

Since the car body bolster 15 is supported on and insulated from the truck bolster 12 by resilient rubber mountings, which receive all forces transmitted between the car body bolster and the truck, the normal shocks resulting from such forces are substantially eliminated, and the shocks resulting from such excessive forces are greatly reduced. The necessary relative movements between the car body bolster 15 and the truck wheels are provided by the resilient mountings which are interposed between the channel members 23 and 24 of the suspension unit 10. The customary bolster supporting compression springs, swing links for the spring platform, and the large amount of axial play between the journal boxes and flanges of the car wheel axles may be eliminated.

The ease with which a freight car may be converted from a steel spring to a rubber suspension system by means of the suspension unit of this invention will be apparent from the foregoing description. To so modify existing vehicles one need merely discard the steel springs and add the two channel shaped members 23 and 24 and their appurtenant resilient rubber sandwiches. When required the platform 19 is inserted under the ends of the bolster 12 to raise the center bearing 18 of the suspension unit 10 to the original height of the center bearing 14 of the bolster 12. The elements of the suspension unit 10 are adapted to cooperate with existing elements of railway cars with little or no modification of the latter. The suspension unit of this invention preferably is pre-assembled and placed on the truck bolster as a unit, but it may be assembled on the truck bolster if desired.

From the foregoing it will be apparent that I have invented a simple, efficient suspension unit which can be stored as a packaged unit and used to convert readily the existing steel spring suspension systems of railway vehicles to a rubber suspension system. Although I have shown and described one concrete embodiment of my invention it will be apparent that modifications may be made therein without departing from the spirit or scope of this invention. Accordingly, I do not wish to be limited by the foregoing description, but only by the scope of the subjoined claims.

Having thus described my invention, what I claim and desire to protect by Letters Patent is:

1. A railway car truck, comprising a truck frame having side members, separate raised platforms supported on said side members, a truck bolster on said platforms, a lower elongated inverted channel shaped member having legs depending from its base and downwardly on each side of said bolster, and an outwardly projecting flange at each end of each said depending legs, a buffer pad on each said flange, an upper elongated inverted channel shaped member having legs which depend from its base and straddle said legs of said lower member, a projecting flange at each end of each depending leg on said upper member being located opposite said buffer pads, a rubber sandwich disposed at each end of and between said bases, each said sandwhich being affixed to said bases of said upper and lower members and to said bolster, and a side bearing above said sandwiches at each end of said upper member.

2. A suspension unit for supporting a car body bolster on a truck bolster, said unit comprising an inner and an outer telescoping channel shaped member, each of said members having a base and legs depending from said base, each of said bases and legs being adapted to extend lengthwisee of said bolster, and each of said legs being adapted to straddle said bolster on each side thereof, said inner member being adapted to be supported on the truck bolster, and said outer member being adapted to support the car body bolster, resilient dense rubber compression load supporting mountings interposed between the ends of the bases of said members and having their opposite faces secured to the opposite faces of said bases, lateral projections on one of said members located opposite lateral projections on said other member, said projections being normally spaced from each other and adapted to limit the movement of said outer member longitudinally in respect to said inner member, and resilient buffers secured to said projections on one of said members and located opposite said projections on said other member to cushion the longitudinal movement of said inner and outer members in respect to each other.

3. A suspension unit for supporting a car body bolster on a truck bolster, said unit comprising an inner and an outer telescoping channel shaped member, each of said members having a base and legs depending from said base, each of said bases and legs being adapted to extend lengthwise of said bolster, and each of said legs being adapted to straddle said bolster on each side thereof, said inner member being adapted to be supported on the truck bolster, and said outer member being adapted to support the car body bolster, resilient dense rubber compression load supporting mountings interposed between the ends of the bases of said members and having their opposite faces secured to the opposite faces of said bases, resilient dense rubber compression and shear mountings interposed between and secured to the opposite telescoping sides of said members, lateral projections on one of said members located opposite lateral projections on said other member, said projections being normally spaced from each other and adapted to limit the movement of said outer member longitudinally in respect to said inner member, and resilient buffers secured to said projections on one of said members and located opposite said projections on said other member to cushion the longitudinal movement of said inner and outer members in respect to each other.

4. A suspension unit adapted to convert railway cars having a car truck bolster from steel spring to rubber suspension, comprising a lower elongated inverted channel shaped member having depending legs and a base adapted to be fixed to said bolster, an upper elongated inverted channel shaped member having depending legs adapted to fit over said lower member, said upper member having a center bearing and two side bearings adapted to cooperate with a center bearing and side bearings of a railway car bolster, two dense rubber compression sandwiches interposed between the bases of said channel members, one of said sandwiches being fixed to said upper and lower members and to said bolster at each end of said bolster, and a dense rubber compression and shear sandwich interposed between and having its opposite sides secured to the depending legs of said first upper and lower members at each side of said bolster.

5. A suspension unit adapted to convert railway vehicles having a truck bolster from a steel spring to a rubber suspension, comprising a lower elongated inverted channel shaped member having a base and depending legs adapted to fit over said bolster, each of said legs having a laterally projecting flange at each end thereof, a buffer pad on the inner face of said flange, an upper larger elongated inverted channel shaped member adapted to fit over said lower member and having a base and depending legs, said depending legs of said upper member having portions adapted to fit between said laterally projecting flanges on said lower member, a projecting flange at each of said portions of said upper member disposed opposite said buffer pad, a compression resilient mounting comprising upper and lower metal plates bonded to opposite sides of a rubber block disposed between the bases of said channel members at each end thereof, means fixing said lower metal plate of each rubber block to said lower member and said bolster, and means fixing said upper metal plate of each rubber block to said upper member.

6. A railway car truck comprising a truck frame, a platform on each side of said truck frame, a truck bolster having its ends supported on said platforms, a lower elongated member supported on said bolster and having legs depending from a base and extending downwardly on each side of said bolster, an upper elongated member having legs depending from said base and extending downwardly on each side of said lower member, said bases of said lower and upper members extending to a point near the ends of said bolster, a dense rubber compression sandwich interposed between said bases of said upper and lower members at each end of said bases, and a dense rubber compression and shear sandwich disposed between and having its opposite sides secured to said depending legs of said upper and lower members on each side of said bolster.

References Cited in the file of this patent

UNITED STATES PATENTS

| | | |
|---|---|---|
| 114,587 | Morse | Mar. 9, 1871 |
| 1,621,035 | Storer | Mar. 15, 1927 |
| 1,924,237 | Glascodine | Aug. 29, 1933 |
| 2,046,391 | Latshaw | July 7, 1936 |
| 2,099,031 | Neal et al. | Nov. 16, 1937 |
| 2,545,956 | Julien | Mar. 20, 1951 |
| 2,645,188 | Williams | July 14, 1953 |